(12) United States Patent
Patel et al.

(10) Patent No.: US 8,155,880 B2
(45) Date of Patent: Apr. 10, 2012

(54) LOCATION TRACKING OPTIMIZATIONS

(75) Inventors: Jignesh M Patel, Ann Arbor, MI (US);
Yun Chen, San Jose, CA (US);
Karthikeyan Ramasamy, Santa Clara, CA (US)

(73) Assignee: Locomatix Inc., Santa Clara, CA (US)

( * ) Notice: Subject to any disclaimer, the term of this patent is extended or adjusted under 35 U.S.C. 154(b) by 976 days.

(21) Appl. No.: 12/151,799

(22) Filed: May 9, 2008

(65) Prior Publication Data
US 2009/0282122 A1 Nov. 12, 2009

(51) Int. Cl.
*G01C 21/00* (2006.01)

(52) U.S. Cl. ..................... 701/400; 455/456.3

(58) Field of Classification Search .................. 701/200, 701/400; 370/351, 338, 356; 455/456.3, 455/414.2, 404.2, 403; 379/114.01
See application file for complete search history.

(56) References Cited

U.S. PATENT DOCUMENTS

| | | | | |
|---|---|---|---|---|
| 7,853,197 | B2 * | 12/2010 | Tawil et al. | 455/3.02 |
| 7,917,155 | B2 * | 3/2011 | Karr et al. | 455/456.1 |
| 7,920,966 | B2 * | 4/2011 | Emoto et al. | 701/209 |

\* cited by examiner

*Primary Examiner* — Dalena Tran
(74) *Attorney, Agent, or Firm* — FSP LLC

(57) ABSTRACT

A computer-implemented method includes probing a first band along a centerline dimension for a distribution of Location Based Notifications (LBNs), the distribution including a majority of LBNs clustered along and overlapping with the centerline.

20 Claims, 14 Drawing Sheets

LOCATION TRACKING OPTIMIZATIONS

BACKGROUND

Location based services are services that require knowledge of and usually provide features relating to the location of something. The objects of interest may be alive or inanimate. For example, location based services may be provided in relation to a vehicle, a nonmoving location (e.g. when a person moves into that location), a person such as a teenager or elder, a pet, or a valuable farm animal. A fleet of trucks may be tracked and nearby features of interest to their drivers, such as the near presence of a refueling station, may be presented to a driver. Another example is informing a person entering an airport that a shop within the airport has a sale. This second example not only illustrates a location based service but the information transferred also has a time component as it may only be sent when a sale is occurring and at a time when the store is open. Some location based services might be presented to anyone at the correct location and time, others may be tailored. For example, a message about a sale at the duty free liquor shop may not be sent to a teetotaler.

Some LBS applications may require frequent or almost continuous tracking of location information about one particular object. Some LBS applications may require processing, sometimes frequent processing, of location information about a large number of objects. If an application provides information based on the objects which are, at a point in time, in some sense near a particular location or other objects, and everything is potentially on the move while this information is being provided, substantial processing power may be needed.

What is needed, then, is a system and associated procedures to provide LBS applications with efficient and scalable location tracking capabilities that allow processing a large number of objects, and/or updates, for location-based services, in a cost-effective manner. These applications may process large scale location updates and both long-standing and one-time spatio-temporal queries in near real time.

REFERENCES THAT MAY BE OF INTEREST

U.S. Pat. No. "6,049,711, Apr. 11, 2000, Ben-Yehezkel et al. provides a method for location-based information services, but does not provide any methods for scalable support of such services.

U.S. Pat. No. "6,157,841, Dec. 5, 2000, Bolduc et al." is related to storing a plurality of location information in a database, and does not consider scalable methods of using this information for Location-based services.

Chakka, V., Everspaugh, A., and Patel, J. (2003), Indexing Large Trajectory Data Sets with SETI, *CIDR* pages 164-175. The authors propose an index structure, SETI, for managing historical trajectory information of moving objects. This work is suited for answering queries on historical trajectory.

Gedik, B. and Liu, L. (2004), Mobieyes: Distributed processing of continuously moving queries on moving objects in a mobile system, *EDBT* pages 67-87. The article discusses a grid index approach for distributed processing of continuously changing LBS notification queries. However, the work relies on the assumption that the end user devices processes the computation and storage resources for local monitoring and evaluation of long-standing spatio-temporal queries, which limits the flexibility of the system.

Saltenis, S., Jensen, C., Leutenegger, S., and Lopez, M. (2000), Indexing the Positions of Continuously Moving Objects, *SIGMOD* pages 331-342. The method addresses the issue of indexing continuously moving objects for the purpose of answering one-time predictive spatio-temporal queries by modeling the movement of objects.

Tao, Y., Papadias, D., and Sun, J. (2003), The TPR*-Tree: An Optimized Spatio-Temporal Access Method for Predictive Queries, *VLDB* pages 790-801. The method described improves the performance of the method proposed by Saltenis et al. by introducing efficient heuristics for index organizations.

Patel, J. M., Chen, Y., and Chakka, V. P. (2004), Stripes: an efficient index for predicted trajectories, *Proceedings of the 2004 ACM SIGMOD international conference on Management of data* pages 635-646. ACM Press. The technique described employs a dual-transform technique and a quadtree index structure for modeling and indexing moving objects for handling one-time predictive spatio-temporal query processing.

(Hanan Samet) "The quadtree and related hierarchical data structures"

Guttman, A. (1984), R-trees: A dynamic index structure for spatial searching, *SIGMOD'84*, Boston, Mass., Jun. 18-21, 1984 pages 47-57. ACM Press.

Beckmann, N., Kriegel, H.-P., Schneider, R., and Seeger, B. (1990), The r*-tree: An efficient and robust access method for points and rectangles, *Proceedings of the 1990 ACM SIGMOD International Conference on Management of Data*, Atlantic City, N.J., May 23-25, 1990 pages 322-331. ACM Press.

Hellerstein, J. M., Naughton, J. F., and Pfeffer, A. (1995), Generalized search trees for database systems, *Proceedings of 21st International Conference on Very Large Data Bases*, Sep. 11-15, 1995, Zurich, Switzerland pages 562-573. Morgan Kaufmann index.

BRIEF DESCRIPTION OF THE DRAWINGS

In the drawings, the same reference numbers and acronyms identify elements or acts with the same or similar functionality for ease of understanding and convenience. To easily identify the discussion of any particular element or act, the most significant digit or digits in a reference number refer to the figure number in which that element is first introduced.

DETAILED DESCRIPTION

Figure 1:
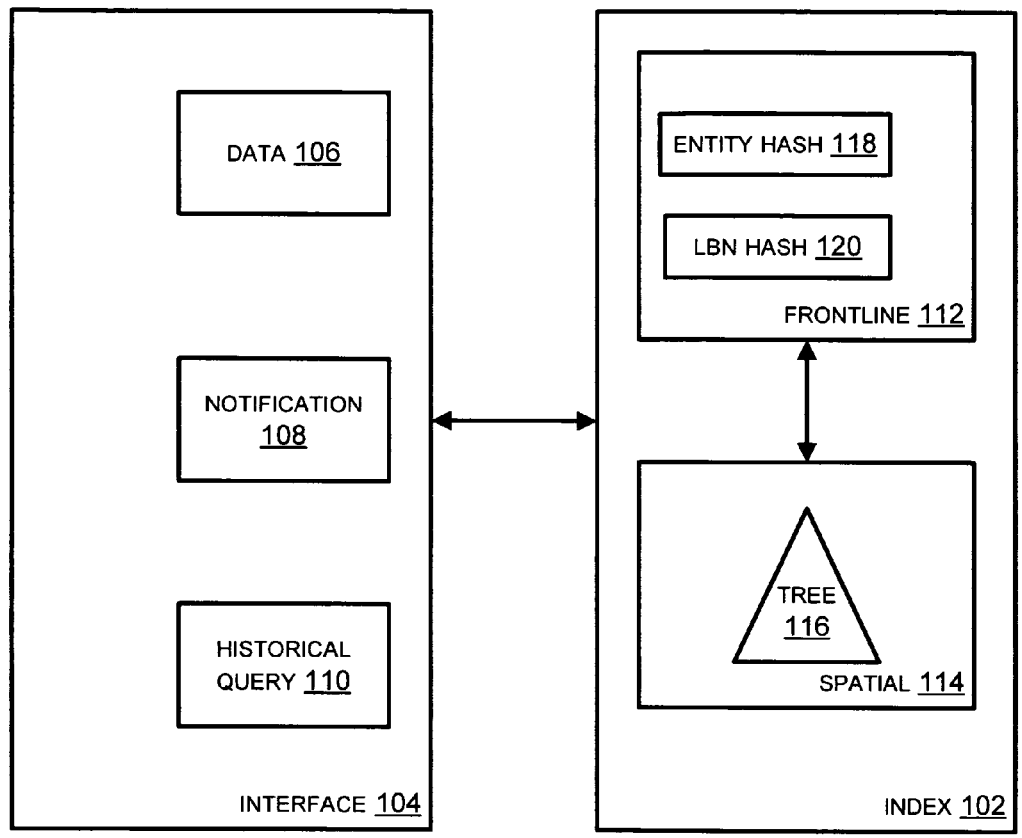
FIG. 1 is a block diagram of an embodiment of a location tracking and query system.

References to "one embodiment" or "an embodiment" do not necessarily refer to the same embodiment, although they may.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, refer to this application as a whole and not to any particular portions of this application. When the claims use the word "or" in reference to a list of two or more items, that word covers all of the following interpretations of the word: any of the items in the list, all of the items in the list and any combination of the items in the list.

"Logic" refers to signals and/or information that may be applied to influence the operation of a device. Software, hardware, and firmware are examples of logic. Hardware logic may be embodied in circuits. In general, logic may comprise combinations of software, hardware, and/or firmware.

Those skilled in the art will appreciate that logic may be distributed throughout one or more devices, and/or may be comprised of combinations of instructions in memory, processing capability, circuits, and so on. Therefore, in the interest of clarity and correctness logic may not always be distinctly illustrated in drawings of devices and systems, although it is inherently present therein.

Generally, the following description is directed to Location-based Service (LBS) application management. A platform is described that enables LBS applications to monitor the movement of constantly moving objects (entities) and to send and receive notifications triggered by events due to changes in location of those entities. Both large scale location updates, and long-standing and/or one-time spatio-temporal queries may be processed in near real time. The design is scalable to varying amounts of information that may need to be processed in the system.

A location tracking framework is described that provides indexing and management of location information of individual or groups of moving objects (termed entities henceforth). The framework also supports location-based notification queries (termed LBNs henceforth). The framework:

Tracks up-to-date trajectory information of entities.

Indexes and stores constantly changing LBNs.

Processes LBN updates triggered by a) changes in entity location information, or b) which are explicitly issued by entities.

Integrates the indexing and storage of entity locations and LBNs into one index structure, called the spatial index henceforth.

Supports queries of up-to-date entity locations as well as historical records of entity locations (e.g. trajectories).

Provides a versatile geographical projection interface to accommodate for location data generated in various Spatial Reference Systems.

The location tracking framework described herein may accommodate a variety of spatial reference systems, for which appropriate geographic projection methods may be provided. For applications that target specific geographical regions, location information may undergo a projection procedure before being indexed and stored.

Entities and LBNs may be associated with certain forms of location information, such as latitude/longitude coordinate values reported by a GPS device installed in a cargo truck, or the outline of a warehouse storage building, or a circular LBN area with a one mile radius around some entity, such as a hiker. In some cases, where the area or volume of the location information can be ignored, a point may be used to represent the location information. In other cases where the area or volume of the location information cannot be ignored, a more complex mathematical abstraction of the location information may be employed. Mathematically abstracted location information may be referred to as "geometry".

Data structures and procedures to implement a location tracking framework in accordance with the principles and techniques described herein may be implemented via logic of one or more computing devices. These devices may be deployed in a network environment, in customer locations, and/or by one or more service providers, to name just a few examples.

DEFINITIONS

The following definitions apply to certain terms used herein.

Entity: An entity refers to an individual or a collective group of objects, such as trucks on the road, users with cell phones constantly on the move, doctors and patients in a hospital, or parts of airplanes in a warehouse building. Each entity in the system is uniquely identified by an Entity Identifier (EID). An entity may or may not be associated with one or more Location-Based Notifications.

Location-Based Notification (LBN): Location-based Notifications, or LBNs, refer to long-standing queries with spatio-temporal predicates. Each LBN is uniquely identified by its LBN Identifier (LBNID). The LBNID can be composed in a variety of different ways. One method for constructing an LBNID is as a composite identifier comprising of the EID of the Entity the specific LBN is associated with, and an entity-specific local identifier.

The spatial predicates of LBNs determine the effective geographical regions of the LBNs in physical space, such as a fixed rectangular region, or an evolving circular region centered at a constantly moving entity. The temporal predicates of the LBNs dictate the time period(s) within which the spatial predicates shall stay effective. Examples of a temporal predicate are: "between 3:00 and 4:00 this afternoon", or "every day between 3:00 and 4:00 in the afternoon", or "in the next 10 minutes," etc.

Depending on whether they are associated with entities or not, LBNs are classified into Entity LBNs and Independent LBNs. An example Entity LBN may look like "While I am hiking, send me a notification whenever there is a bear within 1 mile radius of my location." And an example Independent LBN can be "Notify the manager when contents within a certain area in the warehouse change." Overall, Entity LBNs are associated with specific entities and are responsible for monitoring changes dictated by the entities that issued the LBNs. Independent LBNs are not tied to any specific Entity.

Minimum Bounding Box (MBB): The Minimum Bounding Box (MBB) of a geometry refers to a region (e.g. rectangular region for 2-D Cartesian geometry, 3-D box for 3-D Cartesian geometry) that most tightly bounds the geometry. An MBB is typically represented by a set of <low, high> coordinate pairs, one along each dimension of the space. The low and high coordinate values along a dimension are derived from the minimum and maximum of the coordinate values along this dimension of any point within this geometry, respectively.

Trajectory: A trajectory of a moving object refers to a path it follows through space across time. Gathering the exact trajectory of a continuously moving object involves, in theory, collecting location information of the object for each infinitesimal time instant, which is infeasible in reality. It is therefore a common practice to periodically sample location information of the moving object and approximate its trajectory by connecting the series of location information with line segments. Each of these line segments connects two pieces of time-consecutive location information and is called a trajectory segment.

Universe: Universe refers to an application specific parameter that is the MBB of the projection of the geographical region that the application covers.

Geometrical Containment: Geometry g1 is contained by geometry g2 if and only if all points contained within g1 are also contained within g2.

Sub-geometry: Geometry g1 is called the sub-geometry of geometry g2 if and only if g1 is geometrically contained by g2.

Maximum Geometrical Containment a.k.a. Maximum Containment: Geometry g1 is maximally contained by geometry g2 if and only if g1 is geometrically contained by g2, and g1 is not geometrically contained by any sub-geometry of g2. In the rest of this document we will refer to maximum geometrical containment simply as maximum containment.

The framework may interact with various entities using different geographical models. For example, some systems may use floor and room coordinates while others use latitude and longitude coordinates. The framework may employ configurable geographical projection logic to map location coordinates in queries, updates, and other communications to a single coordinate system employed internally by the framework. A reverse mapping may occur for query results and other information communicated back to entities and others from the framework.

Organization of the Index

FIG. 1 is a block diagram of an embodiment of a location tracking and query system. The system further comprises an entity and notification index (frontline 112). The system comprises a spatial index (main 114) organized, for example, using a tree structure 116, and which may reference entity and notification information in the frontline index 112. The spatial index 114 may be organized for fast processing of spatial and spatio-temporal queries. The entity and notification index 112 may be organized for fast processing of entity and notification updates.

An interface 104 to the system may provide notifications 108 to and from the spatial index 114. The interface 104 may provide queries 110 and query results to and from the spatial index 114. The addition and removal of entities and notifications (data 106) may be accomplished via the interface 104 via interactions with the frontline index 112.

The interface 104 may serve as a front-end interface to the system. The interface 104 may communicate and interact with client applications, parse client requests, and communicate requests to the index 102. Client requests may include, among other things, 1) data requests such as entity registration and update, 2) query requests such as long-standing LBN query registration and update requests, and 3) spatio-temporal query requests. The interface 104 may receive and parse information received from client applications and communicate this information to index 102, in accordance with pre-specified data or query processing protocols. For instance, the interface 104 may project latitude/longitude coordinates gathered from GPS devices to coordinates recognizable by the index 102 to be stored and processed properly.

The interface 104 may receive LBN notifications and query results from the index 102 and may pass these to the client applications. Results generated by the index 102 may be processed and delivered to the client applications by the interface 104. To accommodate a wide variety of client applications, the interface 104 may be designed to comply with various communications protocols. As an example, a client application that targets "smartphones" may have notifications delivered as SMS messages to individual users, while a different client application that monitors the movement of fleet vehicles may obtain a handle on a database iterator for retrieval of more detailed information.

The index 102 may comprise an up-to-date snapshot of existing entities and LBNs in the system and provide methods for managing and querying this information. As previously discussed, the index 102 comprises two components: the frontline 112, and the spatial index 114 (typically comprising a tree 116).

In a consistent state, for certain embodiments the index 102 may maintain a single instance of any entity or LBN information. It is possible, however, for the system to be temporarily in an inconsistent state, which is discussed in more detail further into this descriptions. Resource allocation and management of entity and LBN instances may be achieved by the frontline 112. The frontline 112 may temporarily keep a current snapshot of entity/LBN data in main memory. One choice for the frontline 112 implementation is a single level hash table, though in other embodiments choices such as tree-based structures may be selected. In the rest of the description a hash function is assumed, for ease of understanding. Memory blocks for both entities and LBNs in the system are allocated by the frontline 112. Previous systems, e.g. SETI, also employ a frontline structure. However, the frontline of the present system differs from prior designs in that there are at least two storage modules in the frontline: the entity hash 118 and the LBN hash 120.

In one embodiment, the entity hash 118 is where up-to-date entity information is maintained, together with the LBNs associated with individual entities. An appropriate mapping function, such as a hash, may be applied to an Entity EID to produce a mapped key used to store entities in the entity hash 118. The LBN hash 120, on the other hand, may be responsible for storing and managing Independent LBNs by applying a different hash function on the LBNID field of the Independent LBNs. The purpose of the entity hash 118 and the LBN hash 120 is to enable fast lookup of entities and LBNs, respectively, by their identifiers during registration and update processes.

Aside from the capability of managing entities and LBNs by their unique identifies, another requirement the system may fulfill is the ability to manage and query the entities and LBNs by their geographical attributes, e.g. the location of an Entity or the geographical region an LBN covers, for instance. The index 102 may enable this task by organizing entities and LBNs based upon their geographical attributes within the tree 116 of the spatial index 114. The index 114 may employ a wide range of spatial tree index structures, such as a multi-dimensional quadtree. A preferred embodiment is the multi-dimensional quadtree to handle the highly dynamic nature of updates and accesses to this index—the disjoint spatial partitioning and regular decomposition properties of the quadtree offers update efficiency and fast query operations. For the rest of this document, the use of an underlying quadtree structure for the tree 116 of the index 114 is assumed.

Thus, as described, in some implementations, the frontline index 112 may comprise a first hash table 118 storing information about entities and entity LBNs (entity/LBN hash) and a second hash table 120 storing information about Independent LBNs (LBN hash). Likewise, the spatial index 114 may, in some embodiments, also comprise separate trees for a) entities and entity LBNs, and b) Independent LBNs.

Entity motion may result in reconfiguration of the spatial 114 index, as further explained below. For example, if an entity moves significantly so that its geometry is no longer contained in the MBB of the present node it occupies in the spatial index 114, the entity may be "promoted", i.e. removed from the present node and referenced instead from the parent node of the present node, which has a more extensive MBB.

LBNs may also change nodes in the spatial index if, for example, they are updated or changed to reflect different geographical areas. The addition or deletion of entities and LBNs may result in changes to the frontline 112 as well as to the spatial index 114.

Figure 2:
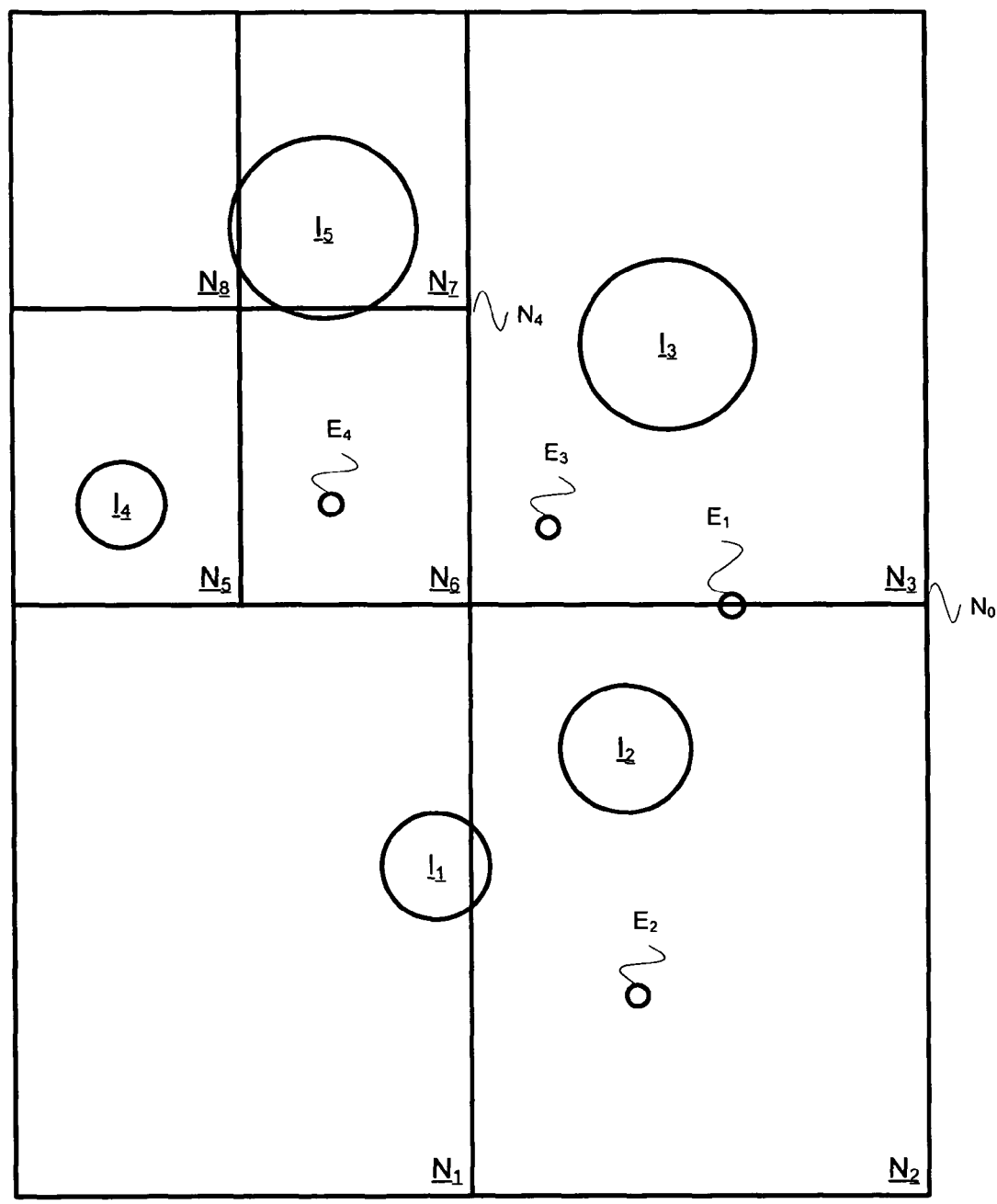
FIG. 2 is an illustration of an exemplary spatial distribution of entities and location-based notifications. A corresponding structure for the spatial index is described in conjunction with FIG. 3.

FIG. 2 is an illustration of an exemplary spatial distribution of entities and location-based notifications. A corresponding index structure for the spatial index 114 is described in conjunction with FIG. 3. Both entities and LBNs are distributed into nodes of the tree 116 by following a tree traversal method. The traversal paths taken are determined at least in part by the maximum containment measure between the MBB of the entity or LBN to be distributed and the MBB of the tree node being examined. The entity or LBN may be distributed into the node if its MBB is maximum contained by that of the node.

Figure 3:
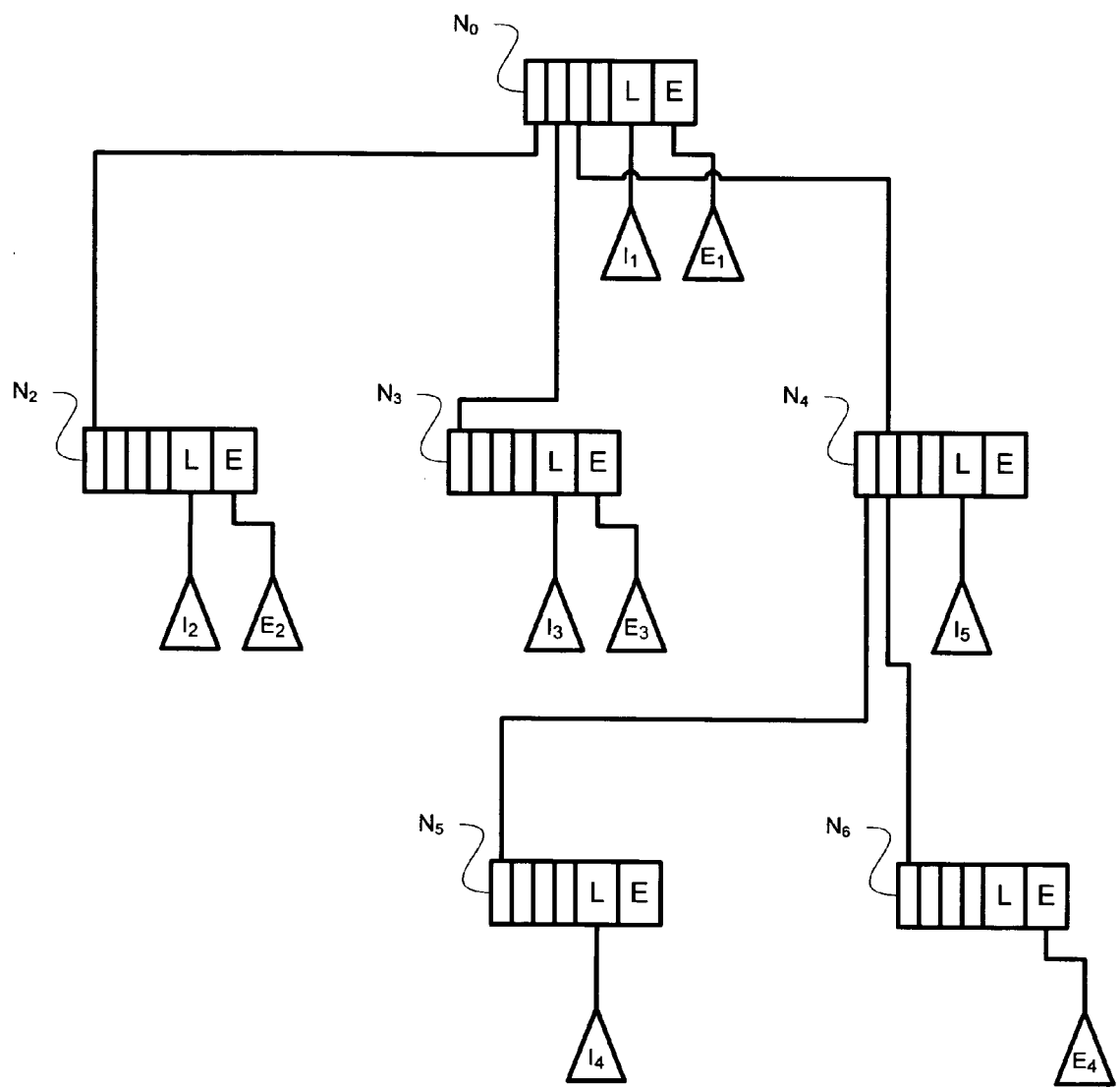

The boxes labeled "$N_i$" in FIG. 2 represent geographical partitions that are in turn represented by nodes in the spatial index tree 116 embodiment of FIG. 3. The "$I_i$" symbols identify LBNs contained within the geometry of the various partitions. The "$E_i$" symbols identify entities contained within the geometry of the various partitions. The LBNs and entities are organized into LBN and entity indexes ("L" and "E" respectively, no subscripts), e.g. sets of pointers to entity and LBN information in the frontline index 112.

Entities and LBNs that span multiple partitions are contained by the smallest partition that contains all the partitions that the entity or LBN spans, e.g. the partition whose MBB maximally contains the MBB of the LBN/entity. Thus, for example, $E_1$ and $I_1$ are contained in node $N_0$.

The basic storage unit of the index tree 116 is a node. Nodes ("$N_i$") have a structure comprising a geographical bounding box, a number of pointers that are used to identify any child nodes that may exist, an Entity Index ("E"), and an LBN Index ("L"). Instances of entities and LBNs are referenced in the tree 116 from nodes, for example using pointers to their actual instances in the frontline 112.

To ensure efficient execution of update and query operations on entities, entities within the geometry of a node may be organized by their location information in an index structure local to the node. This index structure is called the node-specific entity index, or entity index ("E") for short. Likewise, LBNs within the geometry of a node may be organized by their location information in an index structure local to the node. This index structure is called the node-specific LBN index, or ("L") for short.

In FIG. 2, five circular LBNs and four point entities are shown, each labeled $I_1$ to $I_5$ and $E_1$ to $E_5$, respectively. Nine nodes are shown, labeled $N_0$ to $N_8$, respectively, with $N_0$ being the root node, $N_1$ through $N_4$ being level one nodes, and $N_5$ through $N_8$ being level two nodes which are incidentally all child nodes of $N_4$. In this example, LBN $I_1$ crosses the partition boundaries of root node $N_0$ and entity $E_1$ falls exactly on the partition boundary, so they are considered maximum contained by root node $N_0$ and are thus distributed into the LBN index and entity index of $N_0$, respectively. In a similar fashion, LBN $I_5$ is distributed into node $N_4$. LBN $I_2$ and entity $E_2$ are contained by both root node $N_0$ and level one node $N_1$. However, because $N_1$ is the child node of $N_0$ and it does not have any child nodes for itself, both $I_2$ and $E_2$ are therefore distributed into node $N_2$. Similarly, $I_3$ and $E_3$ are distributed into $N_3$, $E_4$ is distributed into $N_6$, and $I_4$ is distributed into $N_5$.

This distribution method results in the tree structure shown in FIG. 3. Because quadtrees are dynamically adjusted to the distribution of the data, empty nodes such as $N_1$, $N_7$, and $N_8$ are not created and are thus not shown in the structure. The entity index and LBN index within a node are also dynamically created as new entries are distributed into the node, thus empty entity and LBN indexes do not appear in the structure, either.

Both the entity index E and LBN index L within a tree node may use the MBB of their entries as the index key and follow similar distribution methods. It therefore may be possible to combine the two indexes into one simplified structure where entity and LBN entries can be distinguished from each other simply by pre-assigned type tags. The advantages of doing so are that the overall storage structure becomes simpler, and the probing operations as will be described later incur one tree traversal and are thus made simple. On the other hand, the single structure approach also has its disadvantages. By combining both entities and LBNs into one structure, the number of index entries increases significantly, and the tree structure becomes significantly larger, which results in slower tree traversals. Each traversal will also incur significantly more index entries on which additional processing time needs to be spent. Thus, in many implementations, separate index structures for entities and LBNs within each node are preferred.

Thus, in summary, for the example of FIGS. 2 and 3, the following statements of containment apply:

$E_1$ contained in $N_0$
$E_2$ contained in $N_2$
$E_3$ contained in $N_3$
$E_4$ contained in $N_6$
$I_1$ contained in $N_0$
$I_2$ contained in $N_2$
$I_3$ contained in $N_3$
$I_4$ contained in $N_5$
$I_5$ contained in $N_4$ The geographical bounding box of the root node $N_0$ in the tree 116 normally represents the Minimum Bounding Box (MBB) of the Universe, which is an application-specific parameter that specifies the largest possible geographical region that the application covers. For example, in the case of a fleet management application that tracks all the transportation trucks within the state of Michigan, the Universe is the geographical region of the state of Michigan, and the MBB of the root node is then set to the smallest rectangular region that entirely encloses the state of Michigan. Depending on the actual implementation of the tree 116, the spatial partitioning and the decomposition schemes may vary. With a multi-dimensional quadtree implementation, for instance, a disjoint partitioning and regular decomposition scheme is employed, in which usually a number of split points are specified along each dimension of the parent MBB using certain heuristics, and the same heuristics are applied recursively to later splits and partitioning as the tree grows in depth. On the other hand, R-tree employs a different set of partitioning and decomposition schemes that may result in very different tree structure. Various partitioning schemes differ only in the effectiveness of the tree structure in effecting searches and updates, and do not affect the correctness of the general scheme of the algorithms.

Child pointers of a node are small memory blocks that store the memory addresses of child nodes. Child pointers of a newly created node may be initialized as null pointers, and only instantiated when the node splits and child nodes need to be created. The maximum number of child pointers a node can contain is a system parameter, and may be determined by the partitioning scheme, namely the number of partitions a node can be geographically split into dictates the number of children the node can have.

The entity index E may accommodate entity location information that can be either geometric points or geographical regions. Therefore the entity index E may be built on the MBB information of the entities' geometry, which is the common practice in spatio-temporal database research and development. The advantages of using MBB as the index key are straightforward.

Spatial relations between MBBs usually involve only a few inequality tests, and may be much simpler and faster to determine than spatial relations between more complex geometries such as polygons, circles, or other irregular geometric shapes. Using MBB as the index key enables the quick pruning out of index entries that do not qualify as results. Thus a much smaller set of potential candidates is obtained, which are then more thoroughly examined by retrieving the exact location information from the frontline 112.

Organization of Entities and LBNs within Node Indexes

Figure 4:
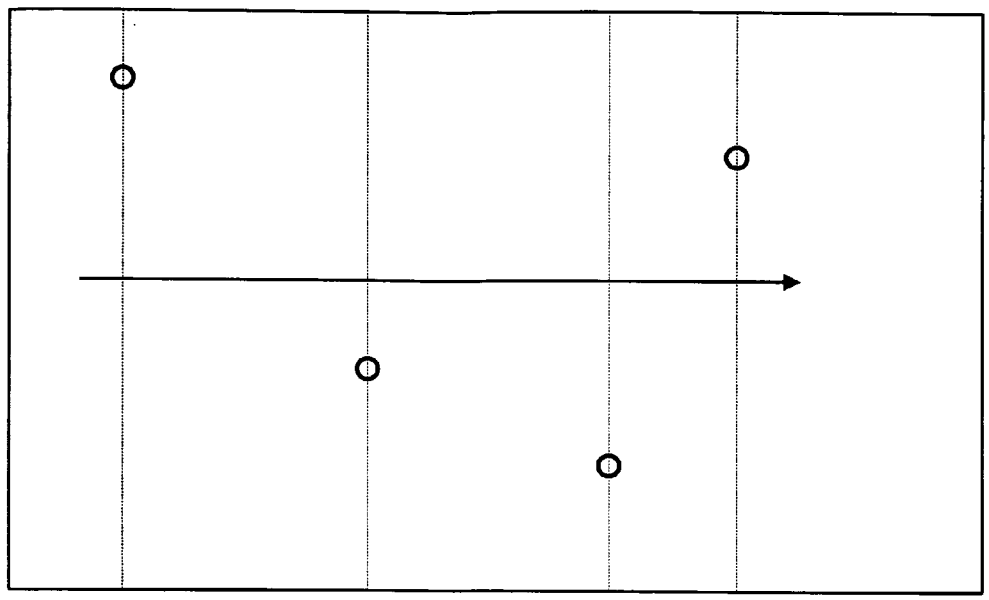
FIG. 4 is an illustration of two embodiments of an entity index organization within a node of the spatial index tree.
Figure 4:
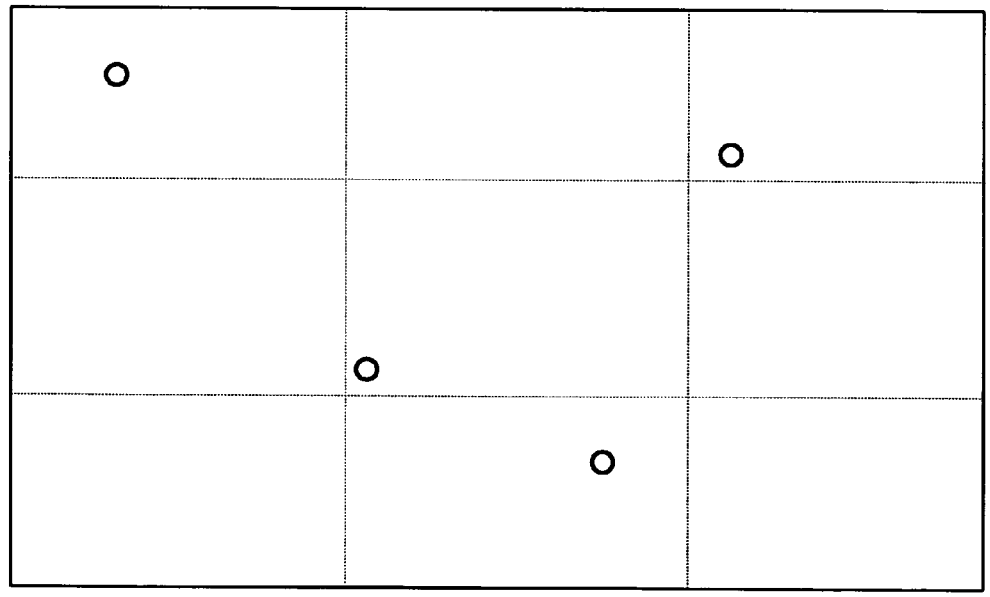

FIG. 4 is an illustration of two embodiments of an entity index E organization within a node of the spatial index tree 116. In the upper embodiment, the entity index E is organized in ascending (or some other order) fashion along one dimension of the spatial geometry. Preferably, a dimension is chosen in along which the entities are most spread apart. In the lower embodiment, the node bounding box (or the MBB of the entities of the node) is further partitioned and the entities are organized according to containment in subpartitions of the node partition.

When the number of entities contained within a node is relatively small, a lightweight flat index structure is more desirable than a complex hierarchical structure such as the R-tree or the quadtree. There are a number of choices possible for the implementation of the entity index E in a node, among which two methods are preferred embodiments. The first method to organize the entities is to use a flat sorted list in which the entities are sorted by their coordinates along a chosen dimension (FIG. 4, top) so that a plane-sweeping technique may be used to speed up the query processing. The other preferred method is to partition the MBB of the node to smaller spatial units called grids and use linear hash functions on the coordinates of the entities to distribute them into the grids (FIG. 4, bottom).

Similar to the node-specific entity index E, nodes of the tree 116 may also comprise an LBN index L to organize pointers to LBNs contained by the node, for fast update and querying purposes. MBB of LBNs may be used as index keys in the LBN index L, and the LBNs within the LBN index L may be organized using similar methods to those in the entity index E.

Figure 5:
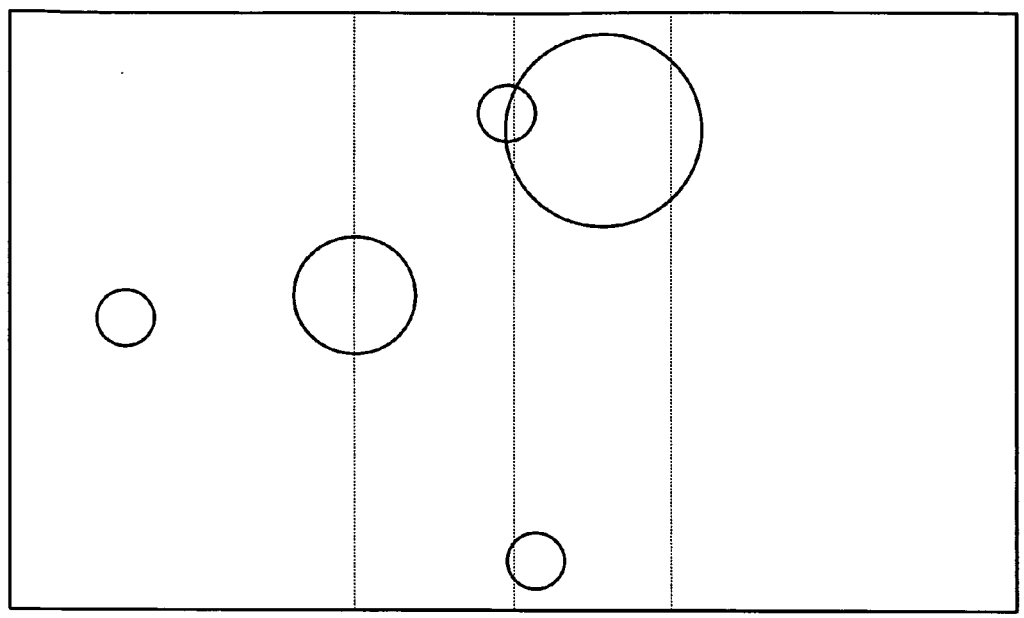
FIG. 5 is an illustration of an embodiment of a notification index organization within a node of the spatial index tree.
Figure 5:
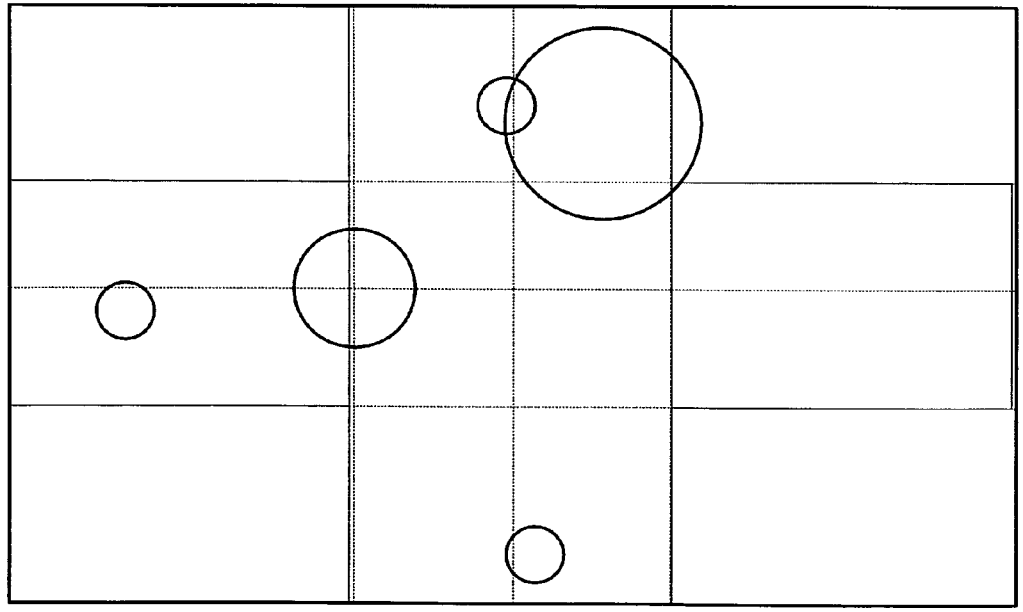

FIG. 5 is an illustration of an embodiment of a notification index L organization within a node of the spatial index tree 116. As was the case for the upper embodiment of the entity index E in FIG. 4, in the upper illustration of FIG. 5, the LBN index L of a spatial index tree node may be organized in ascending (or some other order) fashion along one dimension of the node's spatial geometry. In FIG. 5, the center point of the LBN circle is used for the index coordinate.

In FIG. 5, the lower illustration shows another embodiment of a notification index organization within a node of the spatial tracking index. This organization takes advantage of situations where all LBNs (circles) have a geometry that intersects one of the centerlines of the MBB of the node they are in. A band width is chosen (implementation-specific) and a band of that width is defined along each center split line. LBNs that fall within the bands are organized by the coordinate of their center point (or other anchor point) along the dimension of the band they are contained within. LBNs that don't fit completely into any band may be organized into a separate sorted list arranged according to, for example, one of the schemes described above (e.g. sorted by sparsest coordinate, etc.)

Operations on the Index

Incoming client requests may be classified into various request categories (entity updates, LBN updates, or one-time spatio-temporal queries) by the interface 104. The classified requests may then passed into a geographical projection module, which dynamically adapts to the Spatial Reference System of the incoming data and transforms the incoming requests into formats recognizable by the index 102. Upon reception of LBN notifications and query results from the index 102, the interface 104 may perform a geographical back-projection and respond to the client applications accordingly.

Client requests may include entity updates, LBN updates, and one-time spatio-temporal queries. Upon receiving a projected entity update request, a lookup may be performed on the frontline 112 to locate the entry of the entity if it exists. If the entity update request is the initial registration of an entity, then the entity may be inserted into the frontline 112, with an EID assigned to it, after which an entity insertion operation is performed on the tree 116 (e.g. a pointer is inserted in the tree in the appropriate entity index). On the other hand, if an old entry of the entity is located, then an update is performed for the entity on the frontline 112. During the entity update on the frontline 112, the old information of the entity may be retrieved from the frontline entity hash 118 and temporarily retained, and the new entry then inserted into the frontline entity hash 118. Both old and new entity information may then be used to perform an entity update on the tree 116. During both entity insertion and update operations, LBNs in the tree 116 may be triggered and if so, notifications may be fed back to the interface 104 to form responses to the client applications.

Entity insert operations in the tree 116 begin from the root node $N_0$. The insert operation may begin with a test for maximum containment of the entity geometry with respect to the MBB of the node under consideration. If the test fails then the child nodes are tested and the insertion is propagated down the tree 116. Otherwise if the test succeeds, the entity simply inserted into the entity index E of the node under consideration. After the insertion of the entity, if the entity has LBNs associated with it, then the LBN insertion routine is invoked for each of the LBNs that belongs to the entity. Entity deletion from the tree 116 is similar to the insertion operation described above.

Entity updates on the tree 116 (e.g. due to entity movement) may be processed as deletions of old entity information followed by insertions of new entity information. In one embodiment update operations begin at the root node $N_0$ of the tree 116 and make two traversals down the tree, one for deletion of the old entry and one for insertion of the new entry. When entity updates are issued frequently, the change in location by the entity between updates is usually relatively small, and thus it is likely that two consecutive updates of an entity will remain in the same index node most of the time.

The processing of LBNs in the index 102 is similar to that of entities, due to the fact that both LBNs and entities are organized by their geographical properties in the tree. However, depending on whether the LBN being processed is associated with an entity or not, the procedure in the frontline 112 varies slightly. Procedures involving entity LBNs utilize the entity hash 118, as entity LBNs may be stored within entities which are in turn stored in the entity hash 118. Procedures involving independent LBNs execute on the LBN hash 120, which stores and organizes independent LBNs by their LBNID. During LBN insertion and update procedures, the entity index E of the node of the tree 116 comprising the entity is probed for conditions that may trigger the LBN currently being processed.

Similar to the insertion of entities into the tree 116, the insertion of LBNs may also be a recursive procedure that begins from the root node $N_0$ and propagates down the tree 116. The LBN is tested for whether it is maximum contained in the node under consideration. If the LBN is not maximum contained by the node, then the appropriate child node is located and the insertion test is repeated. If the LBN is maximum contained by the node, it is inserted into the LBN index within the node, and a recursive probing procedure is then invoked to scan the entity index E of the node where the LBN was inserted, as well as all entity indexes in the sub-tree rooted from the node where the LBN was inserted. Probing when an LBN is inserted also may involve filtering and refinement, as discussed with respect to entity insertion/updates, below.

Figure 17:
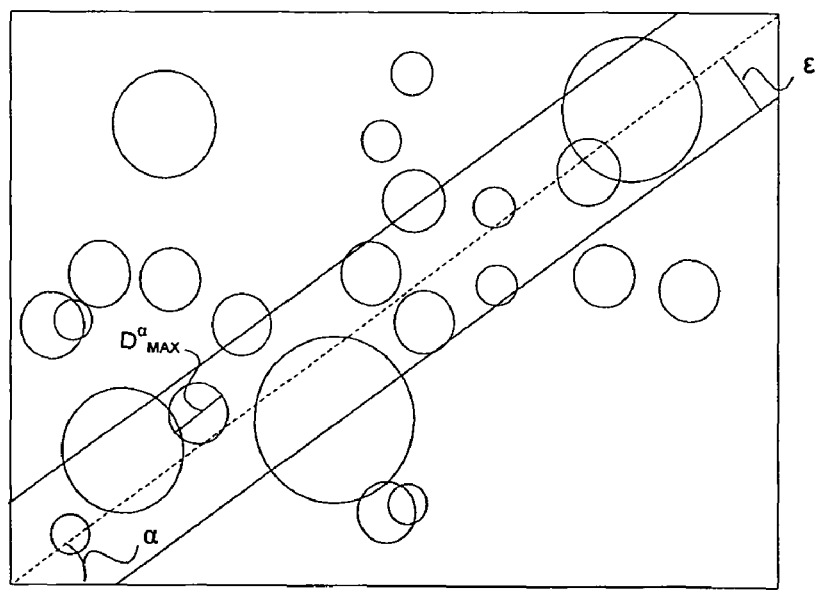
FIG. 17 is an illustration of an embodiment in which the central line is at an arbitrary angle $\alpha$ with the x dimension.

Deletion of an old LBN from the DUET Tree is a relatively simpler process as compared to the insertion of a new LBN, with the assumption that usually when an LBN is to be deleted no further notifications will be required by the client. As is shown in FIG. 17, the deletion of an LBN from a DUET Tree node simply involves locating the LBN entry and removing it from the LBN index when found.

A one-time spatio-temporal query may be processed similar to the manner in which LBNs are processed, with the exception that since the query is not long-standing it may be unnecessary to perform update operations on the LBN indexes (L). A one-time spatio-temporal query mainly involves a time validity check on the temporal predicate of the query followed by a probe on the entity index E.

In certain client applications, such as doctor patient movement tracking application within a hospital, it is natural to categorize entities and LBNs into classes based on their demographic properties. For example, an LBN may be issued to monitor the movements of all patients within a certain ward. To keep track of such an LBN the above described methods are still applicable. However, the efficiency of these methods may be compromised by the fact that during an entity index probe, entries for both patients and doctors are retrieved for evaluation on spatial predicates, which may prove to be unnecessary. To address this particular inefficiency issue, multiple entity and LBN indexes with classification tags may be maintained within a node, so that irrelevant entities or LBNs can be ignored by checking the classification tag and focusing the processing on the classification specific indexes.

Triggering LBNs

Upon successful insertion of an entity, the LBN indexes of the node into which it is inserted, together with those of its children, are "probed". The LBNs whose spatio-temporal predicates are triggered by the entity are identified and notifications are generated for each one. Probes may also be initiated due to entity updates (e.g. movement of the entity) and one-time queries from client applications.

Probing of the LBN indexes may be performed in two stages: the filtering stage and the refinement stage. During the filtering stage, the geometrical relations between the MBB of the inserted or moved entity and the LBN MBBs are examined to test for whether LBN conditions are triggered by the entity's location. If LBN conditions are met during the filtering stage, the LBN is identified as a candidate for triggering, but may not yet be triggered until after the refinement stage.

Figure 6:
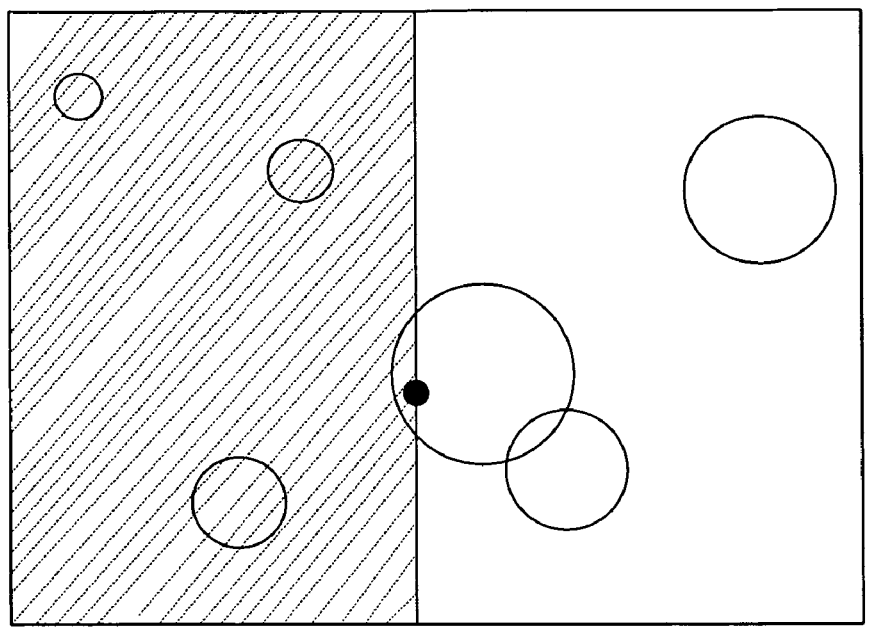
FIG. 6 illustrates an optimization technique to speed up LBN probes.
Figure 6:
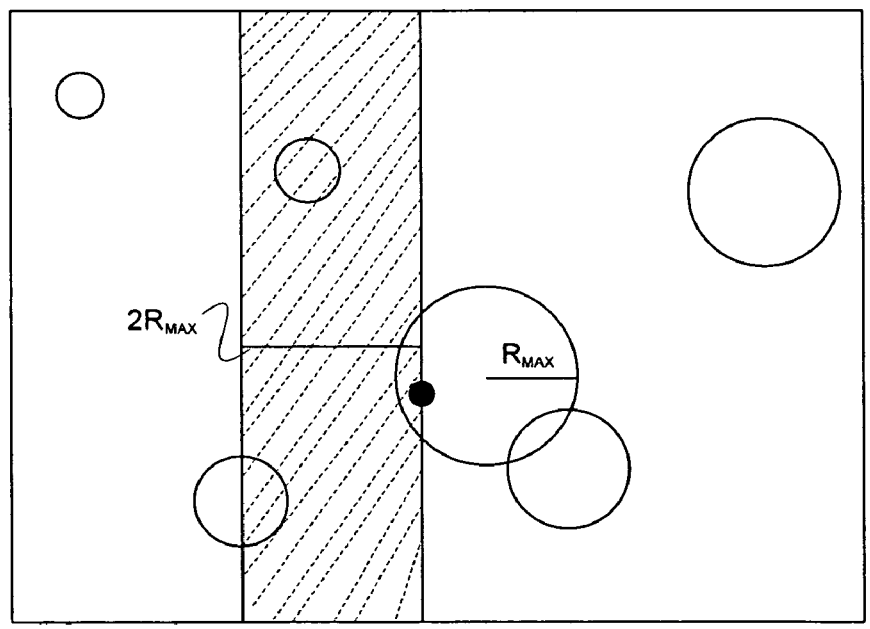

Assume that an LBN index within a node is implemented as a sorted list on the lower boundary of the MBB of the LBNs along the designated dimension (see FIG. 6, top illustration). In FIG. 6 the LBNs are circular regions with point entities at the center. The LBN index may be scanned linearly, starting from the beginning of the list and concluding when the first LBN entry is encountered with a lower boundary greater than the coordinate of the entity under consideration (black circle) along the designated dimension. The result in the hatched probe region in FIG. 6, top illustration. At the end of the filtering stage, a set of candidate LBNs are identified and the refinement stage is performed on the candidate LBN set, during which the exact geometries for both the entity and the LBNs in the candidate set are retrieved and the LBN conditions are examined over the exact geometrical relations between the entity and the candidate LBNs. Candidate LBNs which pass the refinement stage are triggered.

FIG. 6, lower illustration illustrates an optimization technique to speed up LBN probes. Within each node of the tree 116, an additional field is used to keep track of the current maximum radius of the circular LBNs contained by the node. This maximum LBN radius value is shown as $R_{max}$ in FIG. 6, lower illustration. The value of $R_{max}$ is updated after each insertion/update of an LBN into the node. When the LBN index is probed for a particular entity, the starting point of the probing region is determined by the coordinate of the probing entity along the designated dimension, less the value of $2R_{max}$. The ending point of the probing region remains the coordinate of the entity along the probing dimension. Depending on the average size of the LBNs in the system and the distribution of the entities, this optimization technique may result in significant savings in both I/O and computation costs.

Figure 7:
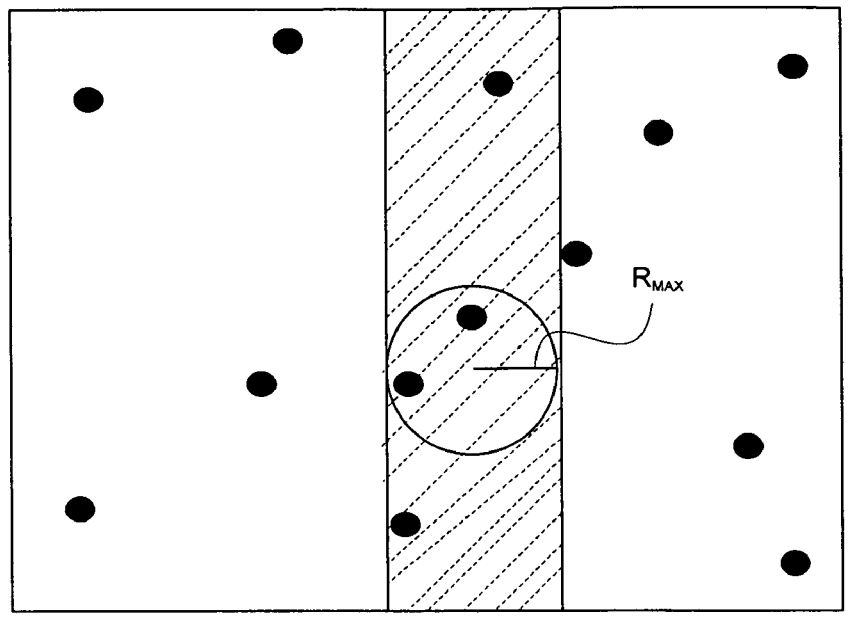
FIG. 7 illustrates two approaches to different filtering techniques that may apply during the LBN insertion process.
Figure 7:
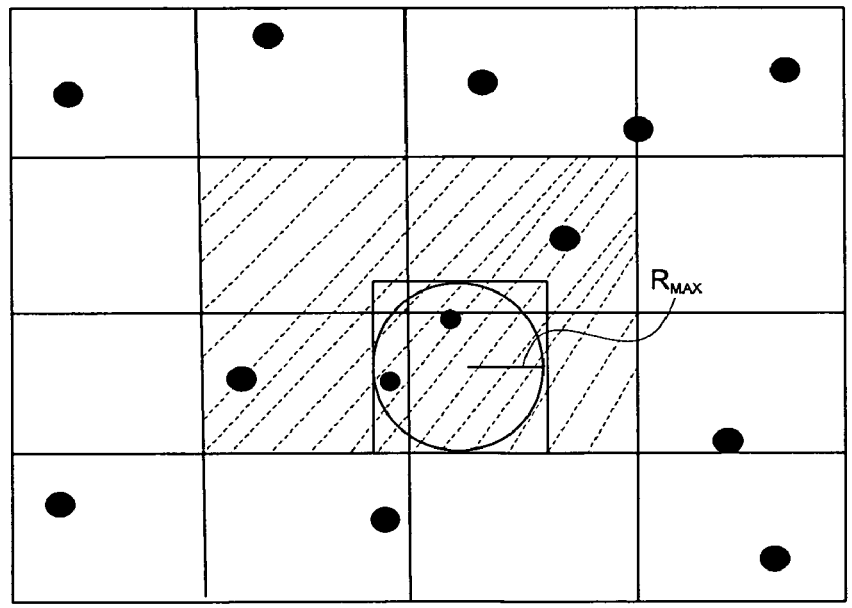

Depending on how the entity index E is implemented within the nodes of the tree 116, different filtering techniques may apply during the LBN insertion process. FIG. 7 illustrates two approaches. FIG. 7, top illustration, shows the filtering technique when the entity index E is implemented as a flat sorted list (see FIG. 4, top illustration). In this case a rectangular sweeping region is formed which is bounded in the designated dimension by the lower and upper bounds of the MBB of the LBN being inserted, shown as the hatched region in FIG. 7. Assuming that the LBN triggering condition is that the entity geometry is contained in the LBN geometry, four candidate entities (dark circles in the hatched region) are identified from the entity index E for consideration in the further refinement stage.

In FIG. 7, lower illustration, a grid partition implementation of the entity index E is assumed (see FIG. 4, bottom illustration). In this example the MBB of the LBN is used as the probing region, and entities (dark circles in the hatched region) inside the four grids in the shaded rectangular region that overlap with the MBB are retrieved for further refinement stage.

Simultaneous Tree Traversal During Entity Updates

During both entity insertion and deletion operations, within a tree node the LBN index probing phase may be the most costly operation in terms of computation resources. Many entity updates may be processed by traversing the index tree 116 with the old entry and the new entry of the entity simultaneously, thus reducing the computational resources consumed by probing.

Figure 8:
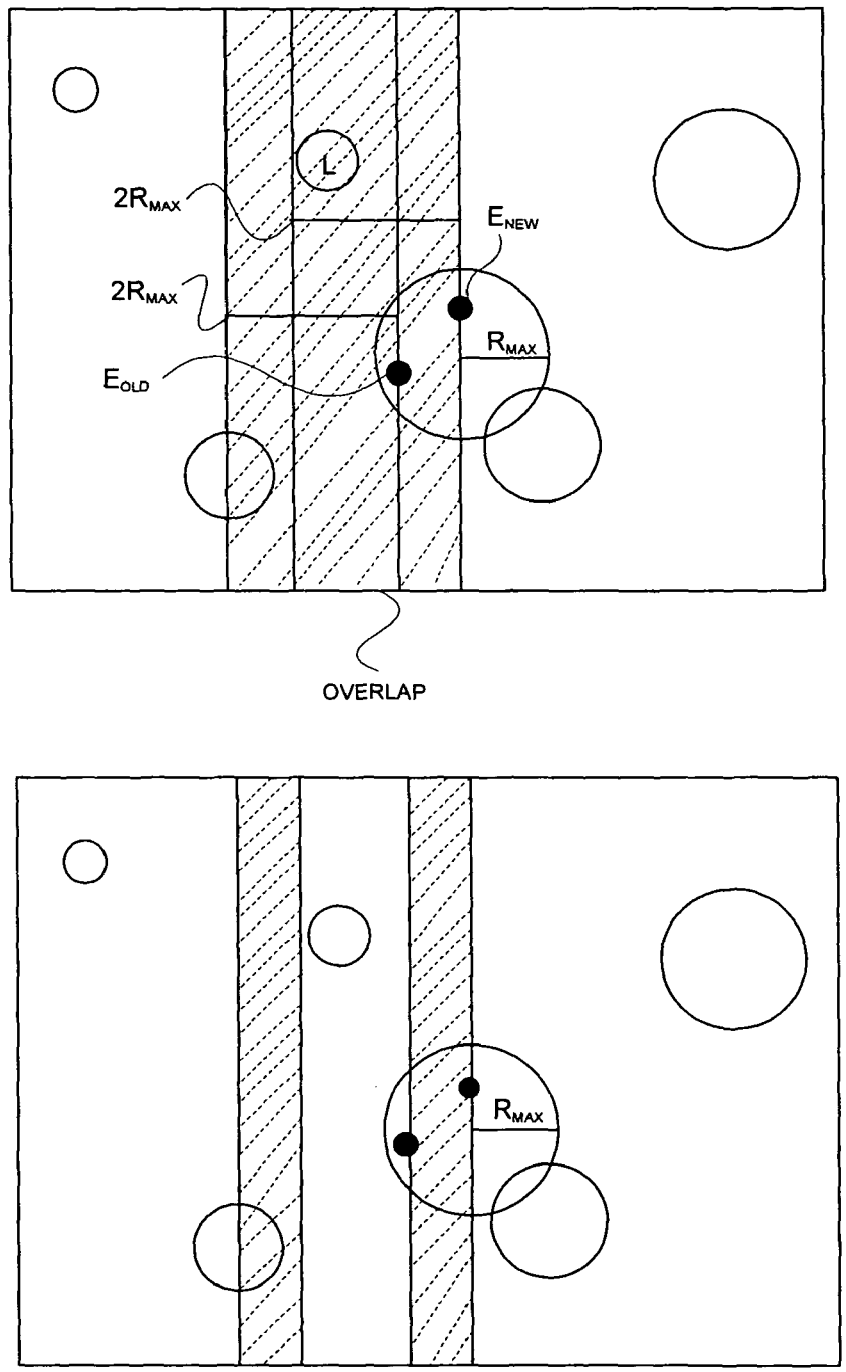
FIG. 8 illustrates computational savings that may be gained by employing simultaneous traversal.

FIG. 8 illustrates computational savings that may be gained by employing simultaneous traversal. In this example, six circular LBNs are contained within the LBN index of a tree node. During the illustrated entity update, point entity E moves to location $E_{new}$ from location $E_{old}$. The LBN probing regions for the deletion of $E_{old}$ and the insertion of $E_{new}$ are represented as the two overlapping shadowed rectangles of width $2_{Rmax}$ along the designated dimension. The two traversal method, as shown in FIG. 8, top illustration, results in two search regions, one for the insertion traversal and one for the deletion traversal. This method identifies (incorrectly) the circular LBN L as a candidate during both insertion and deletion probing. The simultaneous traversal method shown in FIG. 8, lower illustration, on the other hand, only probes the two non-overlapping regions (hatched) and does not identify LBN L as a candidate for triggering. The simultaneous traversal may thus save the cost of performing a refinement test for LBN L.

Figure 9:
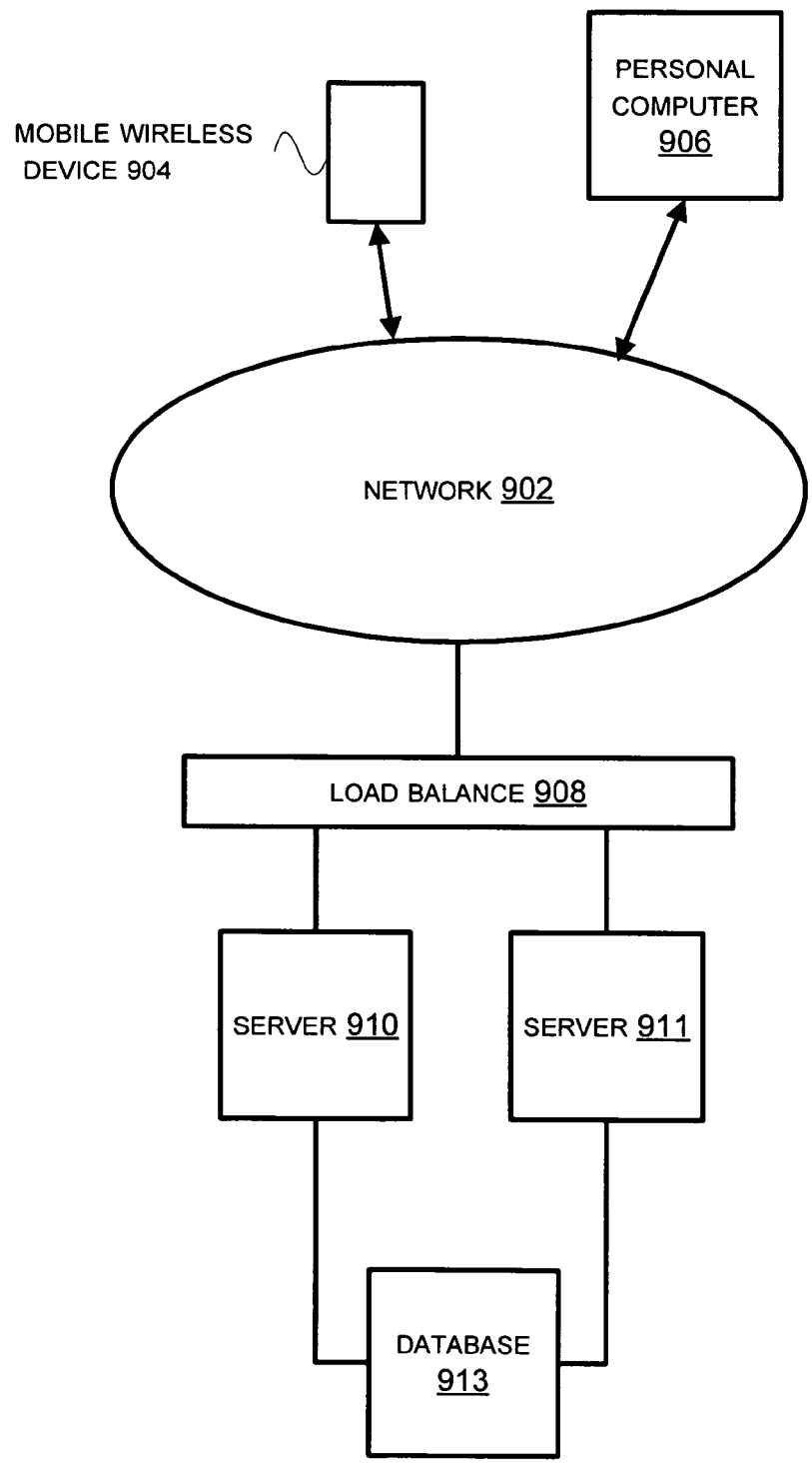
FIG. 9 is a block diagram showing an embodiment of a computing environment in support of a location tracking framework as described herein.

FIG. 9 is a block diagram showing an embodiment of a computing environment in support of a location tracking framework as described herein. The environment may comprise a network 902, a mobile device 104, a personal computer 906, a load balance arrangement 908, one or more servers 910 911, and a database 913, among other components.

The network 902 provides a communication fabric between various system components. In some implementations the load balance 908 and servers 910 911 may communicate with one another via the network as well. The mobile device 104 may communicate location information to the location tracking system, which may be implemented at least partially as logic of the servers 910 911. The mobile device 104 and/or the personal computer 906 may comprise logic to host features of one or more location tracking applications and/or the location tracking interface as described herein. The load balance 908 serves to distribute among the servers 910 911 queries and other functions requiring processing by the location tracking system. The servers 910 911 host logic of the location tracking framework and comprise computational resources such as one or more processors, memory technologies (dynamic RAM, persistent, read-only, etc.). The database 913 may comprise data and data structures to implement one or more of the frontline 112 and the spatial index 102.

In some embodiments, the distribution pattern of LBN queries may be exploited for the purpose of efficient LBN evaluation for location updates issued by constantly moving objects.

For example, an LBN distribution pattern may have the following characteristics:
1. the majority of the LBNs are clustered along a central line;
2. the clustered LBNs all overlap with the central line; and
3. for the majority of the LBNs the spatial extent perpendicular to the central line does not exceed a certain constant $\epsilon$.

An example application that fits the above mentioned distribution pattern is motion tracking on vehicles moving along road networks. For simplicity and ease of illustration, in the following descriptions circular LBNs and point moving entities are assumed, and a "containment condition" (the point entity is contained within the circular LBN) is used as the LBN firing condition. However, the principles described may be adapted to cases where both LBNs and moving entities assume more complex irregular geometric shapes, and/or the LBN firing conditions are more complex forms.

Figure 10:
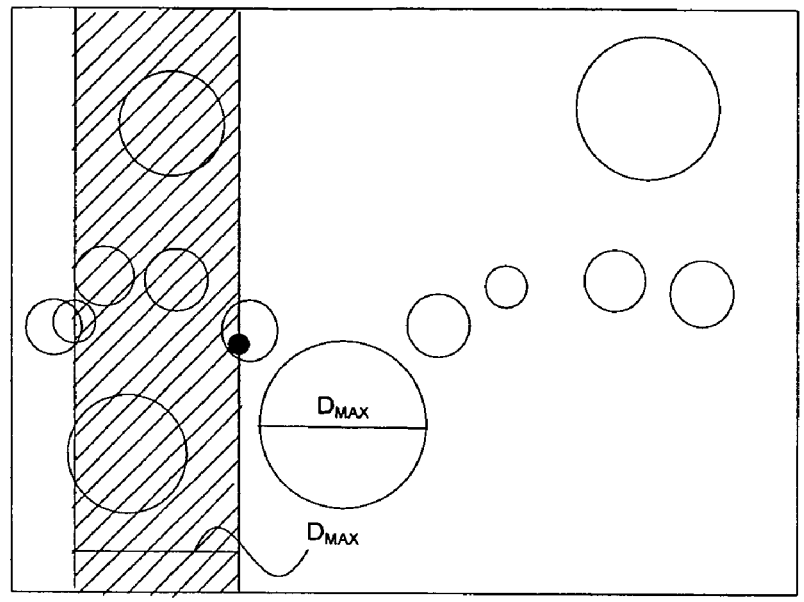
FIG. 10 shows an illustration of an embodiment of LBN probing with the location information of a moving entity.

FIG. 10 shows an illustration of an embodiment of LBN probing with the location information of a moving entity. A number of circular LBNs are shown together with a moving point entity. The LBNs may be organized within a local LBN index of a spatial tree node as a sorted list using their lower bound coordinate along a designated dimension. In this example the x dimension is used. With the sorted list implementation of the LBN structure, when processing location updates of moving entities, a plane-sweeping process along the x dimension may be used to scan for candidate LBNs whose spatial predicates may be triggered by the updates. An optimization technique is to record the maximum extent of the LBNs along the x dimension as they are registered (e.g. placed into the list of the node). This maximum extent is shown as $D_{max}$ (i.e. $2R_{max}$ as described previously). As updates of moving entities are processed, a rectangular probing region with extent $D_{max}$ is formed (the hatched region in FIG. 2), to perform a scan on the currently registered LBNs. LBNs that overlap with the probing region are identified for further exact containment tests against the updated location information.

Figure 11:
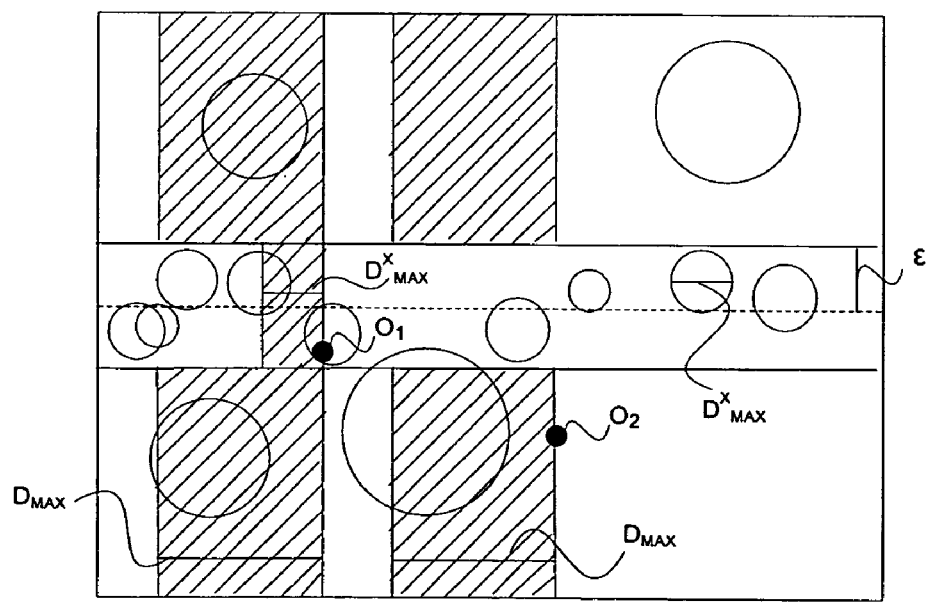
FIG. 11 depicts an embodiment of an optimization technique of probing LBNs with a location update of a moving entity.

FIG. 11 depicts an embodiment of an optimization technique of probing LBNs with a location update of a moving entity. Most of the LBNs are clustered along the dashed line along the x dimension and overlap with it, with the maximum extent along the y dimension being no larger than $\epsilon$ as indicated in the illustration. A band of width $2\epsilon$ can thus be formed along the x dimension, centered at the dashed line. This band is guaranteed to enclose all the LBNs that follow the observed distribution pattern and is termed "x-band" henceforth. Following the practice of using a sorted list as the LBN index structure as previously described, a dedicated index may be constructed on the LBNs contained in this band. The remaining minority of the registered LBNs may be organized into a separate generic structure. As LBNs are being registered and updated they either 1) follow the designated distribution pattern and are distributed into the x-band structure, or 2) are otherwise inserted into the generic structure. In both cases the maximum observed extent along the x dimension is identified, indicated as $D^X_{max}$ for the x-band structure and $D_{max}$ for the generic structure. As location information for moving objects is updated, the LBN probing process may be performed depending on whether the updated location is contained within the band region or not. In the case where the updated location is contained within the band region, shown as the point labeled $0_1$, both the band LBN structure and the generic LBN structure are probed, but with different sweeping regions. The extent of the sweeping region on the x-band structure may be set to $D^X_{max}$ and the extent of the sweeping region on the generic structure may be set to $D_{max}$. The two sweeping region approach may yield significantly fewer candidate LBNs for the further exact containment (refinement) test.

In the case where the updated location is not contained within the band region, shown as the point labeled $0_2$, only the generic LBN structure may be probed with the rectangular sweeping region with extent $D_{max}$ along the x dimension. The overlapping region between the sweeping region and the x-band is deliberately not shaded in order to convey the understanding that this sweeping region only applies to the generic LBN structure and LBNs contained in the x-band are not searched at all in this case.

Figure 12:
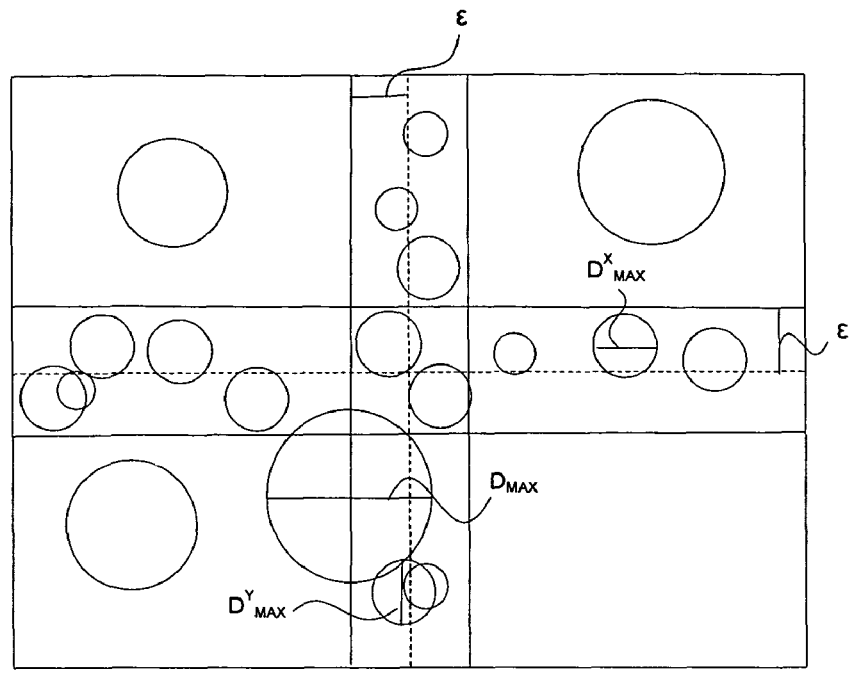
FIG. 12 is an illustration of an embodiment in which the LBN distribution along the y dimension also follows the aforementioned pattern.

FIG. 12 is an illustration of an embodiment in which the LBN distribution along the y dimension also follows the aforementioned pattern. A second band of width 2ϵ may be constructed along the y dimension, with an LBN index for organizing the LBNs contained within the y-band. In this case there may exist, overall, three LBN organizations: 1) one for LBNs within the x-band, 2) one for LBNs within the y-band, and 3) one for the remaining LBNs. The x-band and the y-band overlap at the central area and results in a square region that may be considered as part of either the x-band or the y-band. The decision on which band to include this region in affects the distribution of the LBNs that fall inside the central overlapping region and does not affect the correctness of the probing method, so the implementer is free to choose which band structure to distribute these LBNS, provided the choice is consistent. Another approach is to have yet another organization for the central band. For simplicity of illustration, central region LBNs are included in the x-band organization in this example.

When LBNs are distributed to the y-band structure, the maximum extent along the y-dimension may be recorded and indicated by $D^Y_{max}$. When location updates for moving entities are processed, different LBN structures may be probed for notification firing conditions, depending on which band(s) the location updates fall into.

Figure 13:
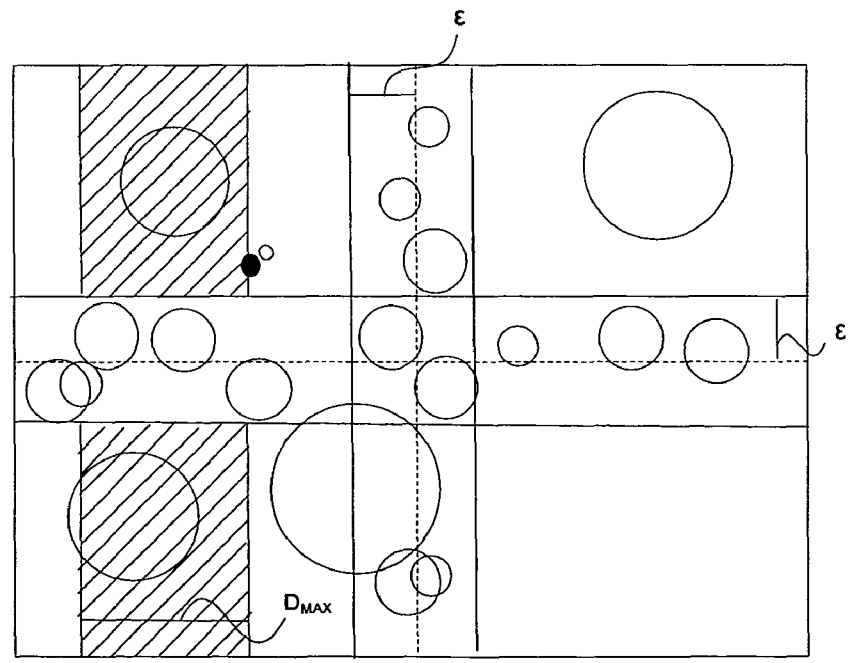
FIG. 13 is an illustration of an embodiment of the LBN sweeping region when the updated location of moving entity O lies outside of both x and y bands.

FIG. 13 is an illustration of an embodiment of the LBN sweeping region when the updated location of moving entity O lies outside of both x and y bands. In this case, the construction of the sweeping region may be the same as that of the sweeping region for entity $O_2$ in FIG. 11, which starts from O and extends $D^X_{max}$ distance towards the negative direction along the x dimension. Only the generic LBN structure is scanned by the sweeping region.

Figure 14:
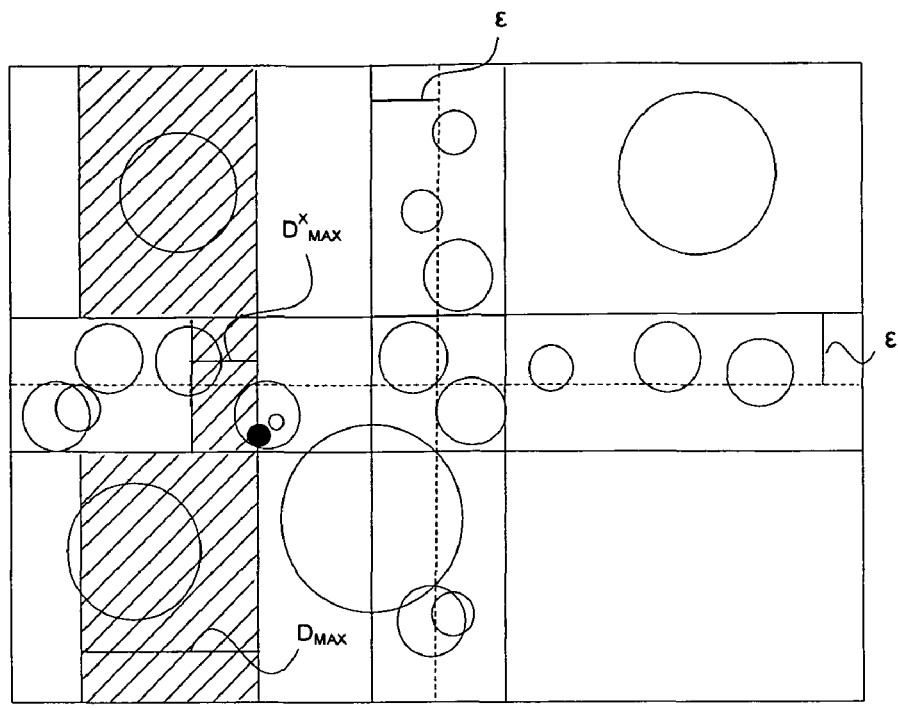
FIG. 14 is an illustration of an embodiment of an LBN sweeping region when the updated location of moving entity O falls within the x-band.

FIG. 14 is an illustration of an embodiment of an LBN sweeping region when the updated location of moving entity O falls within the x-band. This case is the same as that for object $O_1$ in FIG. 11 and further description is omitted.

Figure 15:
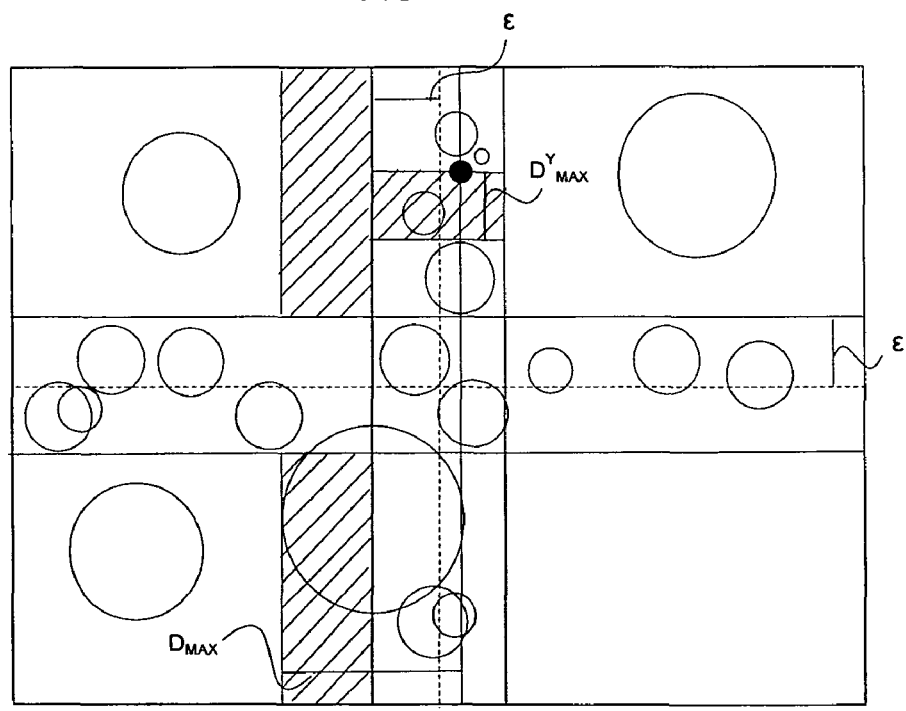
FIG. 15 is an illustration of an embodiment of the LBN sweeping region when the updated location of moving entity O falls inside the y-band.

FIG. 15 is an illustration of an embodiment of the LBN sweeping region when the updated location of moving entity O falls inside the y-band. The construction of the sub-sweeping region along the y-band is as follows: 1) start from O, and 2) sweep downwards for a distance of $D^Y_{max}$ within the y-band. In addition to the y-band sub-sweeping region, a second sub-sweeping region is constructed for sweeping the generic LBN organization by following the procedure described previously. The overlapping areas between the generic sweeping region and the x or y band are not shown because the x and y band organization are not scanned by the generic sweeping region.

Figure 16:
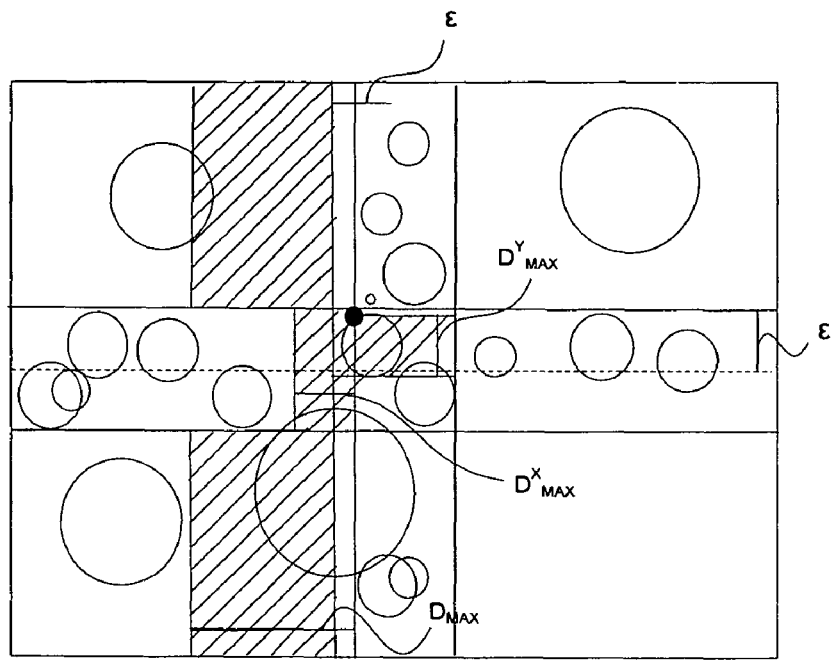
FIG. 16 is an illustration of an embodiment in which the updated location of moving object O falls inside the central region where the x and y bands overlap, all three LBN organizations are scanned, with sub-sweeping regions on these organizations constructed by following previous descriptions.

When the updated location of moving object o falls inside the central region where the x and y bands overlap, all three LBN organizations are scanned, with sub-sweeping regions on these organizations constructed by following previous descriptions. The example is shown in FIG. 16.

Figure 18:
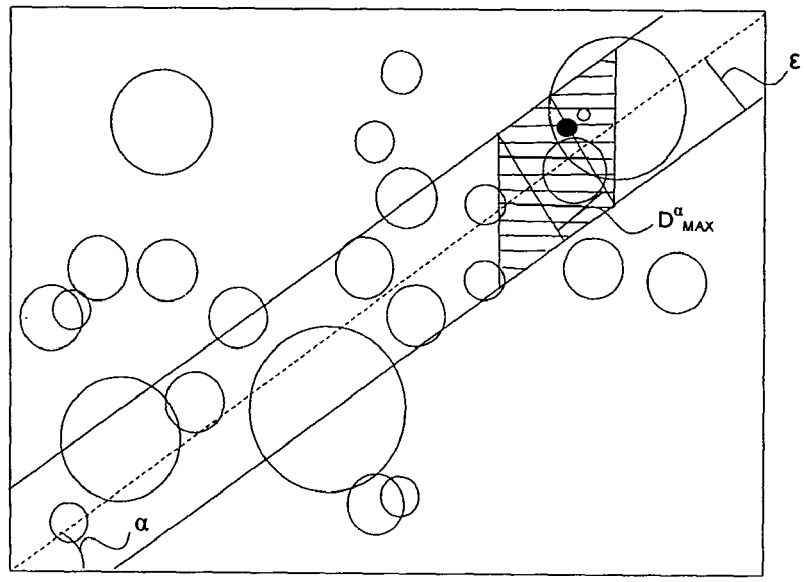
FIG. 18 is an illustration of an embodiment in which the $\alpha$-band structure is organized along the x dimension, and the sweeping region during location update of moving object O is as shown.
Figure 19:
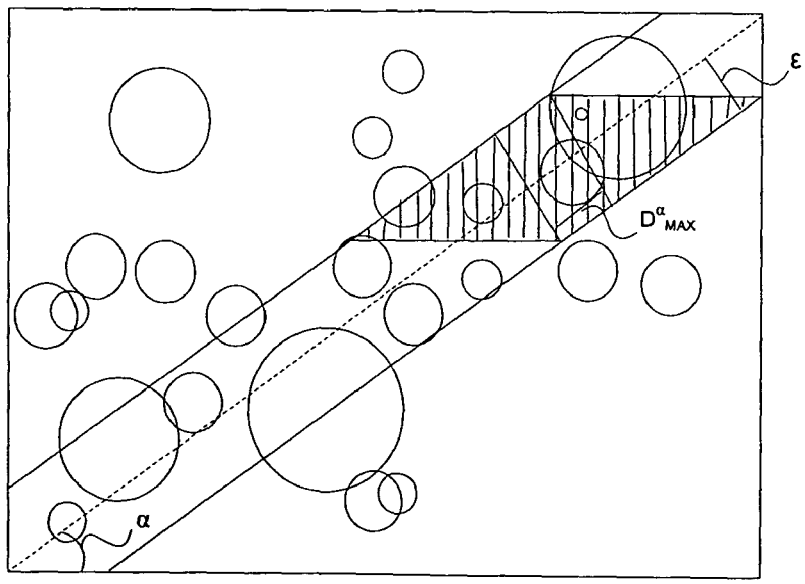
FIG. 19 is an illustration of an embodiment in which the $\alpha$-band structure is organized along the y dimension, an the sweeping region during location update of moving object O is as shown.

The techniques described so far may be generalized to bands with the central line at an arbitrary angle α with the x dimension, as is shown in FIG. 17. The arbitrary angle band may be referred to as the α-band. LBNs contained in the a-band have extent perpendicular to the central line less than ϵ, as well as overlap with the central dashed line. As LBNs are distributed into the α-band, their extents along the central line are determined if they are regular geometric shapes, or estimated by their Minimum Bounding Boxes if they take irregular geometric shapes. The maximum extent along the central line is thus maintained for the α-band, and is labeled $D_{max}^\alpha$. If a sorted list organization is implemented for the α-band index structure, either x or y dimension can be used as the sorting dimension, which will affect the sweeping dimension during location update processing. If the α-band structure is organized along the x dimension, the sweeping region during location update of moving object O is as shown in FIG. 18. On the other hand, if the α-band structure is organized along the y dimension, the sweeping region during location update of moving object O is as shown in FIG. 19. Both sweeping regions may be determined using known parameters α, $D_{max}^\alpha$, ϵ, and the updated location information of object O.

Those having skill in the art will appreciate that there are various vehicles by which processes and/or systems described herein can be effected (e.g., hardware, software, and/or firmware), and that the preferred vehicle will vary with the context in which the processes are deployed. For example, if an implementer determines that speed and accuracy are paramount, the implementer may opt for a hardware and/or firmware vehicle; alternatively, if flexibility is paramount, the implementer may opt for a solely software implementation; or, yet again alternatively, the implementer may opt for some combination of hardware, software, and/or firmware. Hence, there are several possible vehicles by which the processes described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations may involve optically-oriented hardware, software, and or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood as notorious by those within the art that each function and/or operation within such block diagrams, flowcharts, or examples can be implemented, individually and/or collectively, by a wide range of hardware, software, firmware, or virtually any combination thereof. Several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in standard integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies equally regardless of the particular type of signal bearing media used to actually carry out the distribution. Examples of a signal bearing media include, but are not limited to, the following: recordable type media such as floppy disks, hard disk drives, CD ROMs, digital tape, and computer memory; and transmission type media such as digital and analog communication links using TDM or IP based communication links (e.g., packet links).

In a general sense, those skilled in the art will recognize that the various aspects described herein which can be implemented, individually and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment).

Those skilled in the art will recognize that it is common within the art to describe devices and/or processes in the fashion set forth herein, and thereafter use standard engineering practices to integrate such described devices and/or processes into larger systems. That is, at least a portion of the devices and/or processes described herein can be integrated into a network processing system via a reasonable amount of experimentation.

The foregoing described aspects depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality.

What is claimed is:

1. A computer-implemented method comprising:
receiving signals from a plurality of mobile devices via a communication interface;
transforming the signals into location information for the devices;
storing the location information for the devices in a machine memory implementing a spatial index;
probing a first band of the spatial index along a centerline dimension for a distribution of Location Based Notifications (LBNs), the distribution comprising a majority of LBNs clustered along and overlapping with the centerline.

2. The method of claim 1, wherein for a majority of LBNs in the distribution, a spatial extent of the LBNs perpendicular to the center line does not exceed a constant $\epsilon$.

3. The method of claim 1, further comprising:
the distribution of LBNs sorted according to a coordinate along the centerline dimension.

4. The method of claim 1, further comprising:
further probing a second distribution of LBNs that do not fall into the first distribution.

5. The method of claim 4, further comprising:
determining a maximum LBN extent for the second distribution.

6. The method of claim 1, further comprising:
determining a maximum LBN extent along the dimension.

7. The method of claim 1, further comprising:
comparing the LBNs with more specific geometry for an entity.

8. The method of claim 1, further comprising:
probing a second band along a second centerline dimension orthogonal to the first, for a second distribution of Location Based Notifications (LBNs) comprising a majority of LBNs clustered along and overlapping with the second centerline.

9. The method of claim 1, further comprising:
probing a third band comprising a distribution of Location Based Notifications (LBNs) in an overlapping region of the first and second bands.

10. The method of claim 1, further comprising:
the centerline dimension along an angle to the x or y dimensions of a Cartesian grid.

11. A location tracking system, comprising:
at least one computer system comprising non-transitory machine memory configured with logic to probe a first band of a spatial index stored in the machine memory along a centerline dimension for a distribution of Location Based Notifications (LBNs), the distribution comprising a majority of LBNs clustered along and overlapping with the centerline.

12. The system of claim 11, wherein for a majority of LBNs in the distribution, a spatial extent of the LBNs perpendicular to the center line does not exceed a constant $\epsilon$.

13. The system of claim 11, further comprising logic to sort the distribution of LBNs according to a coordinate along the centerline dimension.

14. The system of claim 11, further comprising logic to probe a second distribution of LBNs that do not tall into the first distribution.

15. The system of claim 14, further comprising logic to determine a maximum LBN extent for the second distribution.

16. The system of claim 11, further comprising logic to determine a maximum LBN extent along the dimension.

17. The system of claim 11, further comprising logic to compare the LBNs with more specific geometry for an entity.

18. The system of claim 11, further comprising logic to probe a second band along a second centerline dimension orthogonal to the first, for a second distribution of Location Based Notifications (LBNs) comprising a majority of LBNs clustered along and overlapping with the second centerline.

19. The system of claim 11, further comprising logic to probe a third band comprising a distribution of. Location Based Notifications (LBNs) in an overlapping region of the first and second bands.

20. The system of claim 11, wherein the centerline dimension is along an angle to the x or y dimensions of a Cartesian grid.

* * * * *